US008660879B2

(12) United States Patent
Machtelinck

(10) Patent No.: US 8,660,879 B2
(45) Date of Patent: Feb. 25, 2014

(54) METHOD FOR PROCESSING A LINKED LIST OF TIME SEGMENTS

(75) Inventor: Geert Machtelinck, Mortsel (BE)

(73) Assignee: Agfa HealthCare Inc., Toronto (CA)

( * ) Notice: Subject to any disclaimer, the term of this patent is extended or adjusted under 35 U.S.C. 154(b) by 1198 days.

(21) Appl. No.: 11/817,656

(22) PCT Filed: Feb. 17, 2006

(86) PCT No.: PCT/EP2006/060039
§ 371 (c)(1),
(2), (4) Date: Sep. 20, 2007

(87) PCT Pub. No.: WO2006/094885
PCT Pub. Date: Sep. 14, 2006

(65) Prior Publication Data
US 2009/0276278 A1    Nov. 5, 2009

Related U.S. Application Data

(60) Provisional application No. 60/666,046, filed on Mar. 29, 2005.

(30) Foreign Application Priority Data

Mar. 4, 2005  (EP) ..................................... 05101683
Mar. 4, 2005  (EP) ..................................... 05101703

(51) Int. Cl.
*G06Q 10/00*         (2012.01)
(52) U.S. Cl.
USPC .................................. 705/7.19; 705/2; 705/5

(58) Field of Classification Search
USPC ........................................ 705/7.18, 7.19, 2, 5
See application file for complete search history.

(56) References Cited

U.S. PATENT DOCUMENTS

| 5,528,745 | A  | * | 6/1996 | King et al. ..................... 715/753 |
| 5,860,067 | A  | * | 1/1999 | Onda et al. ................... 705/7.18 |
| 7,822,622 | B2 | * | 10/2010 | Kaindl et al. ..................... 705/2 |
| 2002/0072939 | A1 | * | 6/2002 | Kawaberi ......................... 705/5 |
| 2003/0016248 | A1 |   | 1/2003 | Ubillos |
| 2004/0215780 | A1 | * | 10/2004 | Kawato ........................ 709/226 |
| 2004/0267623 | A1 | * | 12/2004 | Vivadelli et al. ................ 705/26 |
| 2005/0004815 | A1 | * | 1/2005 | Machtelinck .................... 705/2 |
| 2005/0234741 | A1 | * | 10/2005 | Rana et al. ........................ 705/2 |

FOREIGN PATENT DOCUMENTS

| EP | 0 306 965 A2 | 3/1989 |
| EP | 1 531 411 A1 | 5/2005 |
| WO | 02/101622 A1 | 12/2002 |

OTHER PUBLICATIONS

Anonymous, "Zooming in on Visual Calendar Data," Research Disclosure, Kenneth Mason Publications, Westbourne, GB, vol. 329, No. 19, Sep. 1991, one page.

(Continued)

*Primary Examiner* — Stephanie Delich
(74) *Attorney, Agent, or Firm* — Houston & Associates, LLP

(57) ABSTRACT

An appointment scheduling method and associated user interface wherein an overview of appointments of a patient, an overview of the agendas of involved resources and details on an instantiated appointment are displayed on a single screen permitting verification and confirmation of an instantiated appointment by the user.

14 Claims, 10 Drawing Sheets

(56) References Cited

OTHER PUBLICATIONS

Bassat, Ben M., et al., "The W-6 approach to multi-dimensional scheduling: where AI and operations research meet," Proceedings of the International Conference on Systems, Man, and Cybernetics, Los Angeles, Nov. 4-7, 1990, New York, IEEE, US, Nov. 4, 1990, pp. 276-281.

ILOG White Papers, "ILOG Optimization Suite," May 2001, pp. 33-46.

Institute of Medicine, "Crossing the Quality Chasm: A New Health System for the 21st Century," National Academy Press, Washington, D.C., 2001, cited pp. 3, 4, 6, 12 and 127. Full text available at www.nap.edu.

Oddi, A., et al., "Toward interactive scheduling systems for managing medical resources," Artificial Intelligence in Medicine, vol. 20, No. 2, Oct. 2000, pp. 113-138.

Pollack, Martha E., et al., "Execution-Time Plan Management for a Cognitive Orthotic System," Lecture Notes in Computer Science, vol. 2466, Jan. 2002, pp. 179-192.

Schwalb, E., et al., "Temporal Constraints: A Survey," Constraints: An International Journal, vol. 3, No. 2, Jun. 1998, pp. 129-149.

European Search Report from EP 05101682, filed on Mar. 4, 2005.

European Search Report from EP 05101703, filed on Mar. 4, 2005.

International Search Report from PCT/EP2006/060036, filed Feb. 17, 2006.

International Search Report from PCT/EP2006/060038, filed Feb. 17, 2006.

International Search Report from PCT/EP2006/060039, filed Feb. 17, 2006.

International Search Report from PCT/EP2006/060044, filed Feb. 17, 2006.

International Preliminary Report on Patentability from PCT/EP2006/06044, filed Feb. 17, 2006.

* cited by examiner

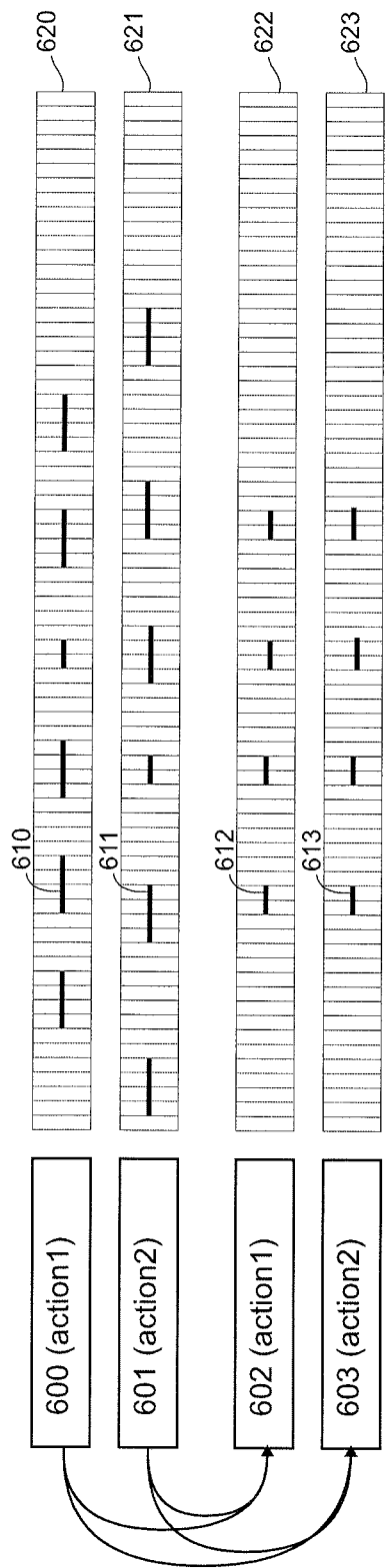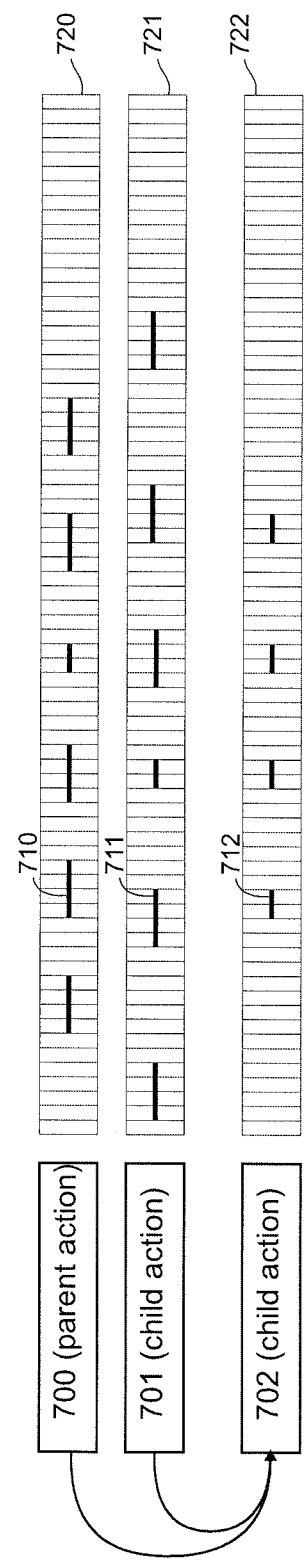
FIG. 7
FIG. 8

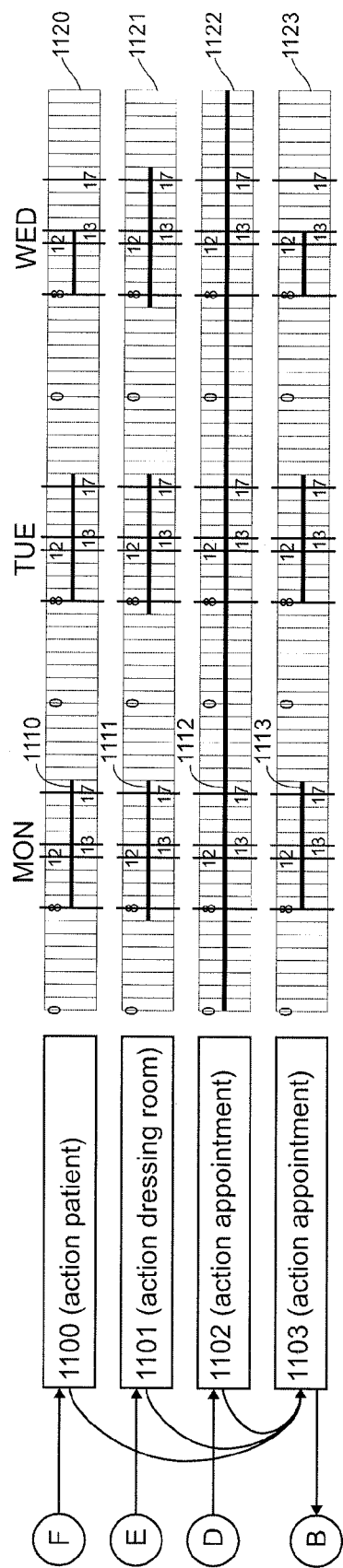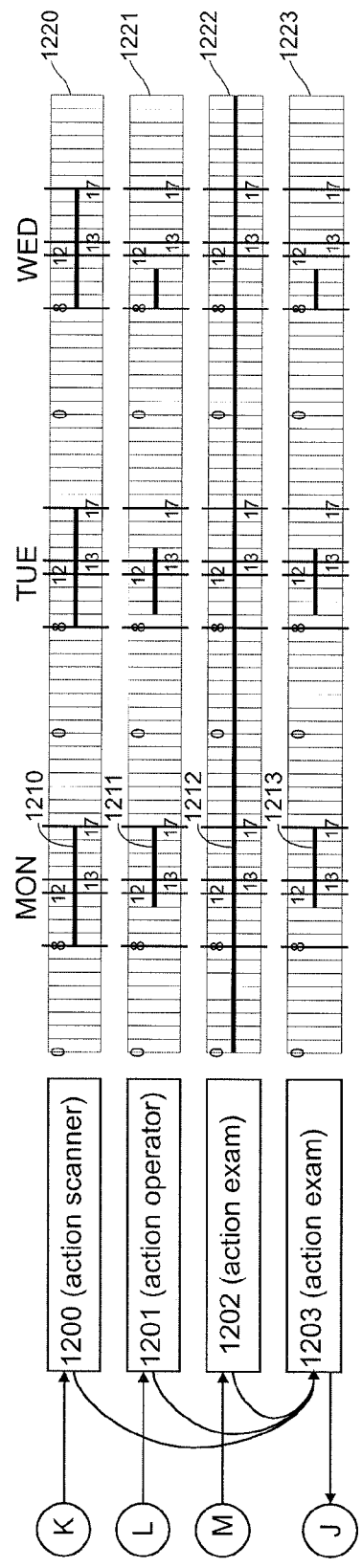
FIG. 12
FIG. 13

METHOD FOR PROCESSING A LINKED LIST OF TIME SEGMENTS

FIELD OF THE INVENTION

The present invention relates to a system for verifying appointments made by means of an appointment scheduling system. The present invention is in particular applicable in the context of appointment scheduling systems to be applied in medical institutions, where appointments need to be scheduled for patients, taking into account a multitude of constraints such as the availability of personnel and equipment, and of the patient himself.

BACKGROUND OF THE INVENTION

When scheduling an appointment, the most directly important stakeholders are the patient and the resources needed for the appointment.

Therefore, when the appointment scheduler finds a free timeslot for a certain appointment and agreed with the patient, it does not mean for him that this is also a convenient solution. He particularly has 2 doubts:
  does this new appointment fit 'well enough' into the agenda of the patient?
  does this new appointment fit 'well enough' into the agendas of the involved resources?

The answer to first enumerated doubt seems trivial to find with the patient at the desk or on the phone, but this is not always the case.

Often the patient is not nearby (patients may be in a room in the hospital, a message may be passed from colleagues, family of the patient may be asking for the appointment, etc. . . . ), so the new appointment must be checked in view of the existing appointments. But even with the patient's presence, a patient tends to forget some appointments or is unaware of the clinical relation (=needed pre-exams or needed post-exams after certain procedures) between his appointments. Typically, a new consultation to evaluate patient's condition can only happen after the scan (or other medico-technical exam) has been taken.

Similarly, check within the resource's agenda is needed.

It may be necessary to check previous and past appointments within that agenda, if they are 'similar enough'. This is important because typically physicians like to have similar particular exams and/or procedures consecutively to increase both efficiency. Moreover, this also increases the effectiveness of their actions. In addition rooms or certain equipment (scanners) are set up for certain types of procedures implying that it is more efficient with regard to use of the resource efficiency to combine similar procedures.

Furthermore it might be necessary to check if certain procedures are possibly close to un-availabilities of a resource, putting them at higher scheduling risk.

It may also be necessary to be able in case of 'forcing' a procedure into an agenda to view the context of this forcing.

Finally, in case there seems to be justification for one of these doubts, the appointment scheduler easily wants to cancel the appointment and select a new one in consensus with the patient's demands.

With existing scheduling applications, a view can be created on a combined resources' agenda, or different resources next to each other, but this is a stand-alone view, manually set up.

In other words, in case the patient (or appointment scheduler) for example changes his opinion, this view has to be reconstructed manually on another day and particular time.

In case of one resource, this would be acceptable—in case of multiple resources involved, this takes additional time, with no guarantee on the outcome.

Additionally, in another view, patient's existing appointments can be shown. A combined view is not possible.

It is thus an aspect of the present invention to provide an improved appointment scheduling method and user interface with verification capability that solves the above described shortcomings of the state of the art.

SUMMARY OF THE INVENTION

The above-mentioned advantageous effects are realized by an appointment scheduling method.

The method comprises the steps of:
  computing and storing a solution space comprising all possible appointment solutions for an appointment scheduling procedure,
  computing and storing a filtered solution space comprising all solutions resulting from a filtering of said solution space on availability of resources and a client's time preferences,
  flagging solutions of said filtered solution space as occupied,
  selecting and storing an instantiated solution out of the filtered solution space,
  retrieving from memory and displaying on single screen at least two of following overviews: overview of said client's appointments, an overview of the agenda of involved resources, details of a selected appointment,
  verifying whether a contextual problem exists for an instantiated solution between items on said overviews,
  in case no contextual problem exists, confirming said instantiated appointment,
  rendering all non-confirmed solutions from said filtered solution space available for another appointment scheduling procedure.

If a contextual problem would exist, another solution is selected out of the filtered solution space and again verified and confirmed or rejected.

Within the model on which the scheduling procedure is based, an area is kept for the appointment solutions. This area consists of 3 parts: the complete solution space S, the filtered solution space F (depending on user's filtering on resources and time preferences) and the instantiated solution I, being a selected appointment. These 3 parts are used until the final appointment has been confirmed.

When selecting the solution I, this is taken to the screen where I is incorporated in the patient's and involved resource's occupation. But S and F are still kept in memory.

When rejecting I by moving back, no new search needs to be performed, since S and F are left untouched. The user can select a new I and the verification process can restart.

In the context of the present invention a solution space is a collection of all solutions that are applicable for a given resource taking into account a given set of constraints.

An example of a scheduling engine for an appointment scheduling system is described extensively in an application entitled 'Method for processing linked lists of time segments', filed by the same applicant on the day of filing of the present application.

The term 'resource' has a broad meaning and refers to physical resources such as radiology room, examination equipment such as a CT scanner and also to human resources such as physicians, operators etc.

A filtered solution space is a sub-set of the solution space and comprises all solutions that meet the user's requirements and constraints on all resources and time preferences.

An instantiated solution is a selected appointment.

A solution is flagged 'occupied' when the corresponding time slot is not available for other scheduling procedures.

A contextual problem exists for an instantiated appointment when a clinical or practical problem would originate when said appointment would be scheduled to take place.

The embodiments of the methods of the present invention are generally implemented in the form of a computer program product adapted to carry out the method steps of the present invention when run on a computer.

The computer program product is commonly stored in a computer readable carrier medium such as a CD-ROM. Alternatively the computer program product takes the form of an electric signal and can be communicated to a user through electronic communication.

Another aspect of the present invention relates to a user interface permitting verification and confirmation of an appointment as set out in the appending claims.

The user interface comprises a display screen on which at least two of the following items are displayed: an overview of a client's appointments, an overview of an agenda of resources involved in an appointment scheduling procedure, details on an appointment.

The user interface further comprises confirmation means for confirming an appointment. These confirmation means are arranged so that in correspondence to their activation a confirmed appointment is reserved and entered in a stored agenda of a client's appointments and in the agenda of the involved resources and so that non-confirmed appointments available in the filtered solution space pertaining to said appointment scheduling procedure are set free.

Specific features for preferred embodiments of the invention are set out in the dependent claims.

Further advantages and embodiments of the present invention will become apparent from the following description and drawings.

BRIEF DESCRIPTION OF THE DRAWINGS

FIG. 7 demonstrates the processing of a relational link according to a preferred embodiment;

FIG. 8 demonstrates the processing of a comprising link according to a preferred embodiment;

FIG. 12 shows an example of processing a relational link according to a preferred embodiment;

FIG. 13 shows another example of processing a relational link according to a preferred embodiment;

DETAILED DESCRIPTION OF THE INVENTION

The invention consists of a continuous interactive solution between a field of possible solutions and a verification screen for a selected appointment out of the solution field.

Figure 1:
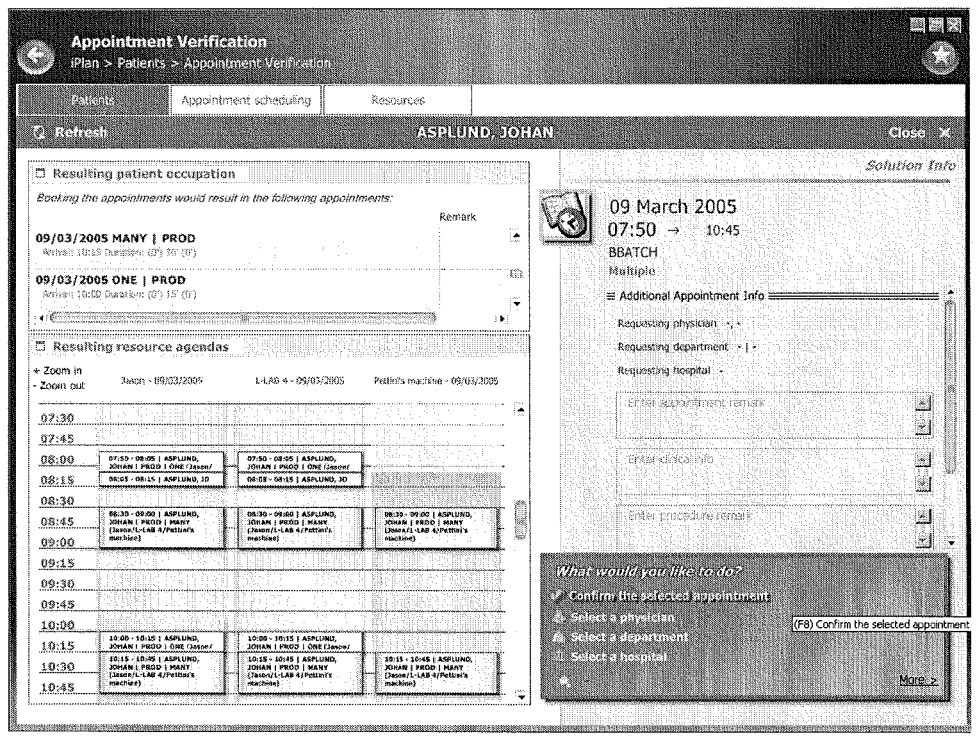
FIG. 1 is a screen shot illustrating the user interface according to the present invention, FIG. 2 describes a set of actions related to resources and connected by comprising, relational and sequential links.

The appointment verification screen itself, illustrated in FIG. 1, consists of 3 parts:

an overview of the patient's existing appointments, with the selected appointment chronologically integrated an overview of the agenda's of the involved resources, with the selected appointment integrated the details of the selected appointment itself.

The solution can be checked in one glance in its context, both in the resources' agendas as in the patient's agenda.

If a contextual problem (clinically, practically) results out of the verification process, the user can navigate by means of the back arrow to the screen displaying the appointment solutions because the information was kept in memory.

When selecting a new solution, the verification process can start again. If positive, the selected and verified appointment solution can be confirmed by activating confirmation means by checking an item in a selection list shown in a separate window (see FIG. 1).

During verification of the appointment, the timeslot is temporarily reserved in all agendas. When rejected, the timeslots are freed. When confirmed, the appointment is fixed in all involved agendas.

Below aspects of the underlying scheduling method, more specifically of the method of generating a solution space, are described extensively.

Before explaining the general principles of the method according to the current invention, the method is first explained by working out a specific example, which is also one specific embodiment of the current invention.

According to the example, an appointment needs to be scheduled to examine a patient by means of a scanner. The patient needs to undress before and to dress again after the scan.

The exam itself takes 2 hours. Both for undressing and dressing one hour is provided. After the patient has undressed, he does not want to wait for the exam. When the exam is finished, he accepts that he may have to wait up to one hour before he can dress again.

Figure 2:
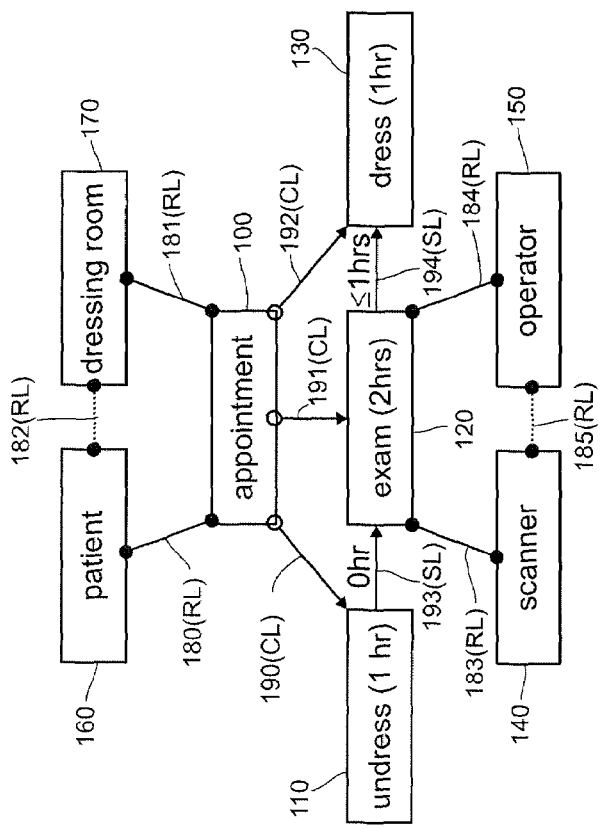

FIG. 2 describes the actions that are part of the appointment and the relations between them. The appointment (100) action comprises three other actions: the undressing (110) action, the actual exam (120) action and the dressing (130) action. This comprising relationship is represented by three comprising links (190, 191, 192) between the individual actions (110, 120, 130) and the appointment (100) action. The appointment (100) action is called a parent relative to the undressing (110), the actual exam (120) and dressing (130) actions which are called children. Because of the parent-child relationship of a comprising link (190, 191, 192), it is not symmetrical.

An action is defined as being "atomic" when it does not comprise other actions. For example, the undress (110) action is atomic, but the appointment (100) action is not.

The undressing (110), the actual exam (120) and dressing (130) actions follow sequentially and this relationship is represented by the sequential links (193, 194). The sequential nature implies that such a link is not symmetrical, as the arrows in FIG. 2 also indicate.

The exam (120) can only be carried out when the scanner (140) is available. This kind of relationship is represented by a relational link (183). In addition does carrying out the exam require the availability of an operator, so a relational link (184) also exists between the exam and the operator (150). A relational link between two actions indicates that both actions can only be carried out at the same time. From this follows that such a link is by nature symmetrical and transitive. The transitivity is expressed in FIG. 2 by the dotted line (185) between the scanner and operator action.

In a more general case, a procedure or exam is preceded by a pre-op action and followed by a post-op action. In a more general case an action refers to an activity related to a resource. Such a resource can be a patient, a physician, a nurse, an operator a diagnostic or treatment apparatus, a examination or treatment room, or any other kind of resource with which an activity can be associated. The resource can or can not be related to the domain of healthcare. The activity can be the use of equipment, the presence of a person, the occupation of a facility or any other activity that refers to the use or availability of any resource. In a more general case any topology of any number of actions related by comprising, relational or sequential links is possible.

Figure 6:
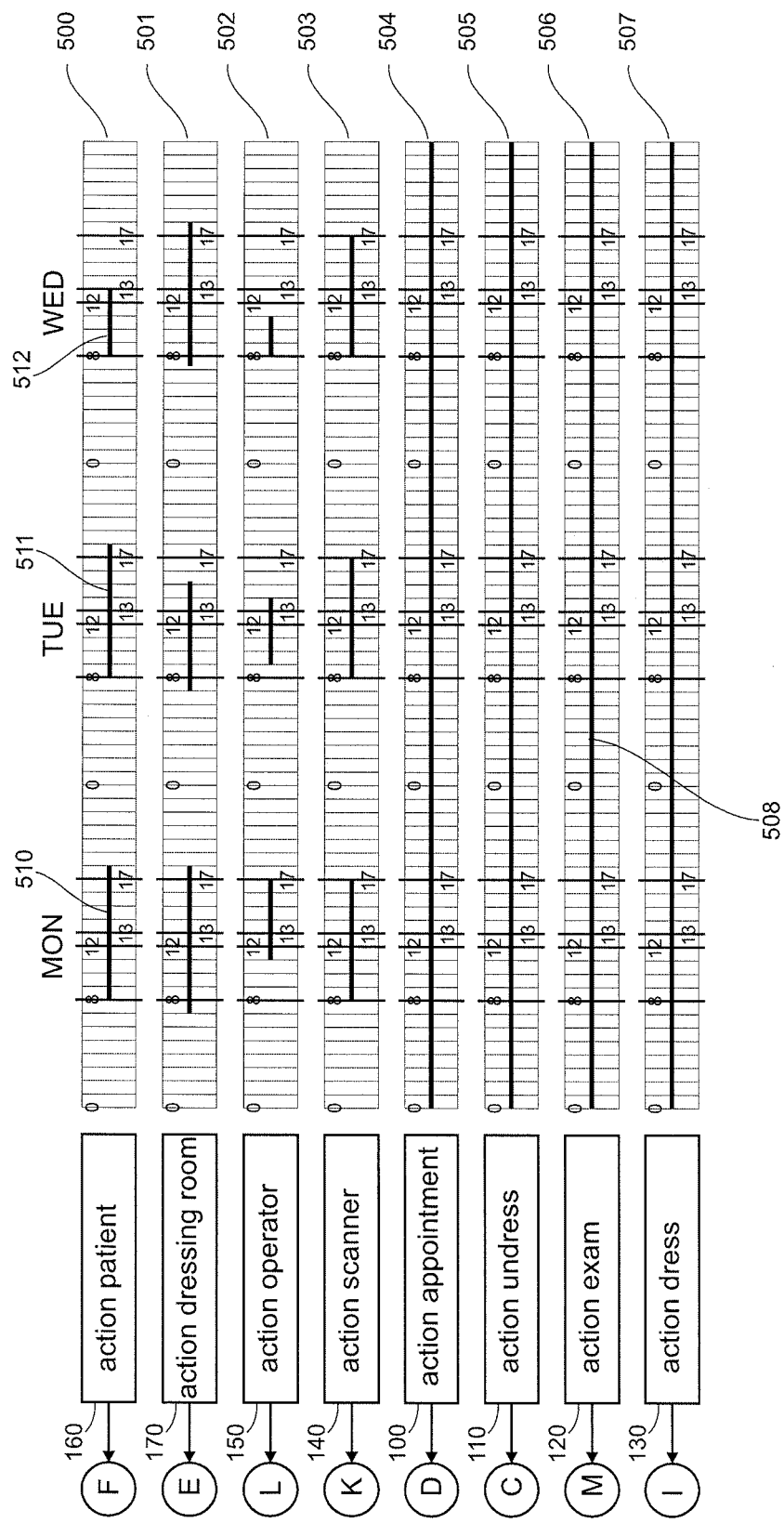
FIG. 6 describes a set of time windows associated with actions.

FIG. 6 shows how with each action (100, 110, 120, 130, 140, 150, 160, 170) in FIG. 2 a corresponding time window (501-507) is associated. A time window consists of a linked list of non contiguous time segments, each segment having a beginning and an ending time. For example, for the patient (160) action, the linked list consists of the time segments (510, 511, 512).

A time window can represent the range of time when an action can potentially occur. However, a time window can also represent a range of time when the action can start or when it can end.

In the example in FIG. 6, the time windows (500-503) of the patient (150), the dressing room (170), the scanner (140) and the operator (150) are part of the problem definition data. These time windows represent constraints imposed by the corresponding resources. The time windows (504-507) of the undressing (110), exam (120) and dressing (130) actions and of the appointment (100) as a whole, however, are initially undetermined, as they are the subject of the solution that has to be calculated for the scheduling problem. An undetermined time window is represented as one contiguous time segment with the length of the time window. For example, 508 is the initial time window associated with the exam action (120). As a solution for the time scheduling problem is being processed according to the current invention, the number of segments of an undetermined time window may change and the beginning and end times of the remaining time segments may become increasingly more focused, until they represent a situation that is consistent with all the constraints imposed by the resources.

Since the constraints imposed by the resources are represented by relational (180-185), comprising (190-192) and sequential (193, 194) links, processing the solution essentially comes down to working out these links.

When working out the links, a number of different cases are to be distinguished that correspond with the different nature of the links (relational, comprising or sequential), the interpretation of the time window of the action (start times, end times or action times), and the relative location of the time segments (the way that the time segments in the time windows of the linked actions overlap). The result of processing a link involves adjusting the time segments in the time windows corresponding to the linked actions in a way that they become consistent with the constraints imposed by the corresponding resources.

In the following paragraphs the processing of the different links is discussed.

First Case

Time Window Processing for Actions Connected Through Relational Links

FIG. 7 illustrates a number of situations for actions connected through relational links, of which the time segments occur in different relative positions (overlapping and non-overlapping). The interpretation of the time windows (620-623) is that they represent the time during which the action (600-603) can take place. Since the meaning of a relational link is that the two actions (600,601) can only take place simultaneously, the effect of working out the link is that each time window (620,621) should be replaced by a time window (622,623) that consists of time segments (612,613) that are the cross sections of the time segments (610,611) in the original time windows.

Because of the transitive nature of a relational link, if an action has more than one relational link—directly or indirectly—to another action, the time windows of all the actions are to be replaced by a time window of which the time segments are the cross sections of all the time segments of the time windows of all the related actions.

Second Case

Time Window Processing for Actions Connected Through Comprising Links

FIG. 8 illustrates a number of situations for actions connected through comprising links, of which the time segments occur in different relative positions (overlapping and non-overlapping). The interpretation of the time windows (700-702) is that they represent the time during which the action can take place. The meaning of a comprising link is that the time segments (711) of a child action (701) have to occur within the time segments (710) of the time window (720) of the parent action (700). This is achieved by replacing the time segments (711) of the time window (721) of the child action (701) by the cross section (712) of themselves (711) with the time segments (710) of the time window (720) of the parent action (700).

Third Case

Time Window Processing for Actions Connected Through Sequential Links

The following terms are introduced or clarified:
  time window of an action: linked list of time segments describing when an action can take place.
  time window of start times of an action: linked list of time segments describing when said action can start;
  time window of end times of an action: linked list of time segments describing when said action can end;

The time window of an action, the time window of start times of the same action and the time window of end times of that same action are interrelated.

Figure 10:
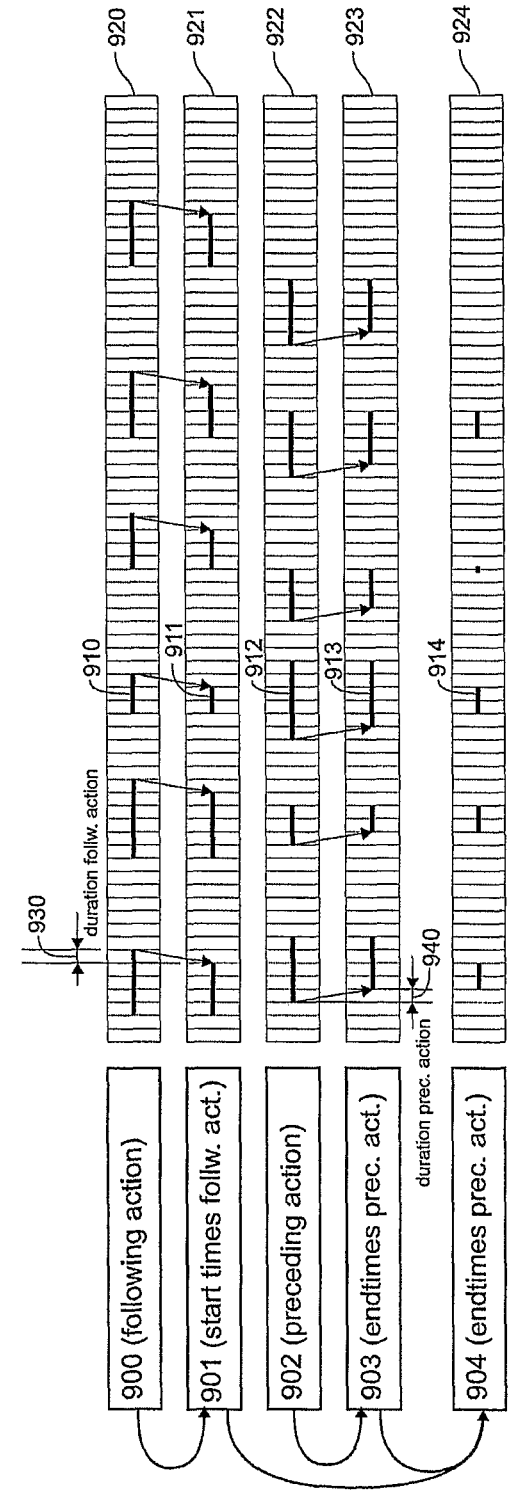
FIG. 10 demonstrates the processing of a sequential link with a following action according to a preferred embodiment.

Referring to FIG. 10 and according to an embodiment of the current invention, a time window (921) representing start times (911) of an is action is calculated from a corresponding time window (920) representing said action, by subtracting from the end times of the time segments (910) in the latter time window (920) the duration (930) of said action.

Referring to FIG. 10 and according to an embodiment of the current invention, a time window (821) representing end times is of an action is calculated from a corresponding time window (820) representing said action, by adding to the start times of the time segments (810) in the latter time window (820) the duration (830) of the action.

According to an embodiment of the current invention time windows representing start times and end times of an action are also interrelated by shifting the start and end times in the time segments by the duration of the action.

According to one embodiment of the current invention, when a first preceding action (800, 902) is followed by a second following action (802, 900), certain restrictions are applied on both the start and end times of both actions.

A first restriction involves the start times of a following action in order to achieve that the start times of a following action can never be earlier than the earliest end time of any of the preceding actions. According to one aspect of the current invention, this effect is achieved by replacing the time segments (813) of the start times (823) of the following action (802) by the cross section (814) between themselves (813) and the time segments (811) of the end times (821) of the preceding action (800).

A second restriction involves the end times of the preceding action in order to achieve that the end times of a preceding action can never be later than the latest start times of any of the following actions. According to one aspect of the current invention, this effect is achieved by replacing the time segments (913) of the end is times (923) of the preceding action (902) by a cross section (914) between themselves (913) and the time segments (911) of the start times (921) of the following action (900).

Figure 11:
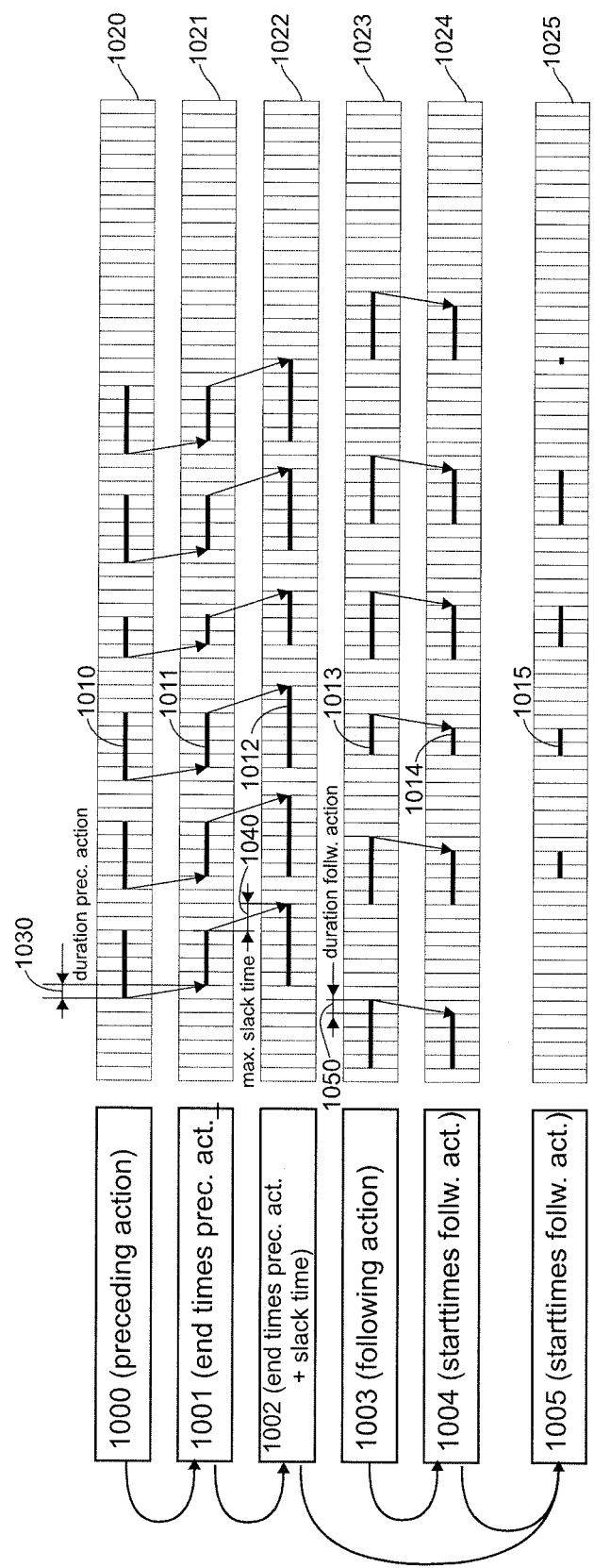
FIG. 11 demonstrates the processing of a sequential link with a following action, taking into account slack time according to a preferred embodiment.

In the case that slack time is allowed between two actions, the end times of the time segments of the preceding action are preferably extended by the maximum allowed slack time, prior to applying said first restriction. Referring to FIG. 11, the time window (1020) of the preceding action (1000) is used to calculate the time window (1021) of the end times (1001) of the preceding action (1000) by shifting the start times of the time segments (1010) forward by the duration (1030) of the preceding action (1000). Following that, the segments (1011) of the time window (1021) of the end times (1001) of the preceding action are extended by the maximum slack time (1040) to yield the time segments (1012) of the time window (1022) of the end times (1002) of the preceding action plus the slack time. To obtain the time window (1024) of the start times of the following action (1004), the end times of the segments (1013) of the time window (1023) of the following action (1003) are shifted backwards by the duration (1050) of the following action (1003). The segments (1015) of the time window (1025) of the start times of the following action (1005) are obtained by making the cross section between the time segments (1012) and the time segments (1014).

Working out a sequential link between two actions involves applying the two above restrictions.

Having described how according to the current invention:
relational links are processed (1);
composite links are processed (2);
the relation between time windows representing actions, start times and end times (3) is processed;
sequential links are processed (4);
slack time is processed in sequential links (5).

We proceed next by working out the example that was earlier introduced according to the principles of the current invention.

The problem that has to be resolved is finding the time window representing the start time(s) for the exam.

A first step consists of working out the relational links in FIG. 2.

Referring to FIG. 12, this is done by using the general principles according to the current invention that were earlier explained by means of FIG. 7.

Similarly, referring to FIG. 13, the relational links can be worked out between the exam, the operator and the scanner.

Figure 3:
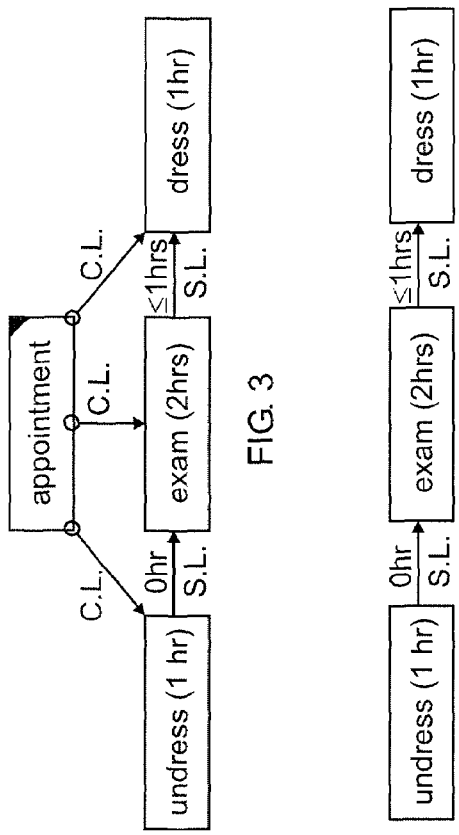
FIG. 3 describes a reduced set of actions that is left after working out the relational links according to a preferred embodiment.

After this operation, the graph in FIG. 2 can be reduced to the one in FIG. 3, with the notion that the time windows associated with the appointment and the exam actions are not the original ones, but the ones that were obtained from the previous step.

Figure 14A:
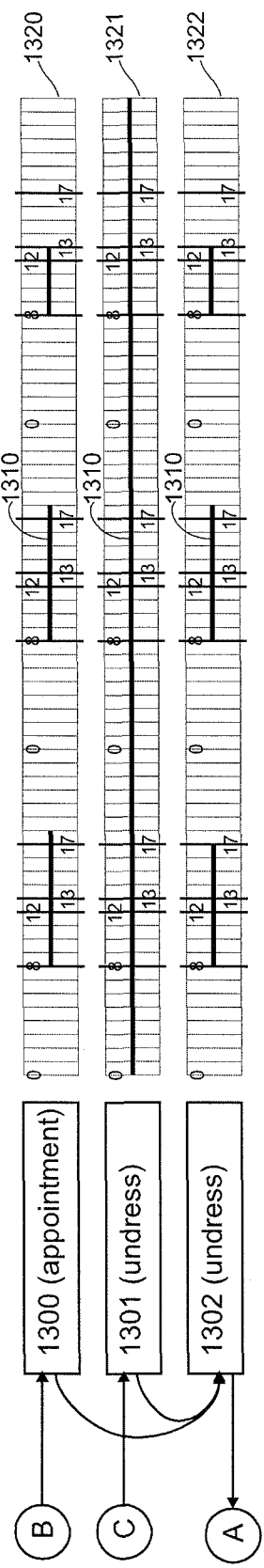
FIG. 14 shows three examples of processing a comprising link according to a preferred embodiment.
Figure 14B:
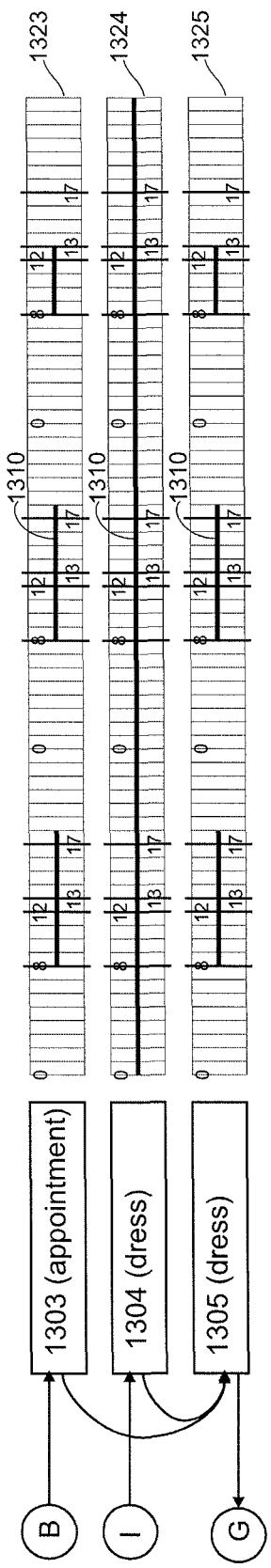
Figure 14C:
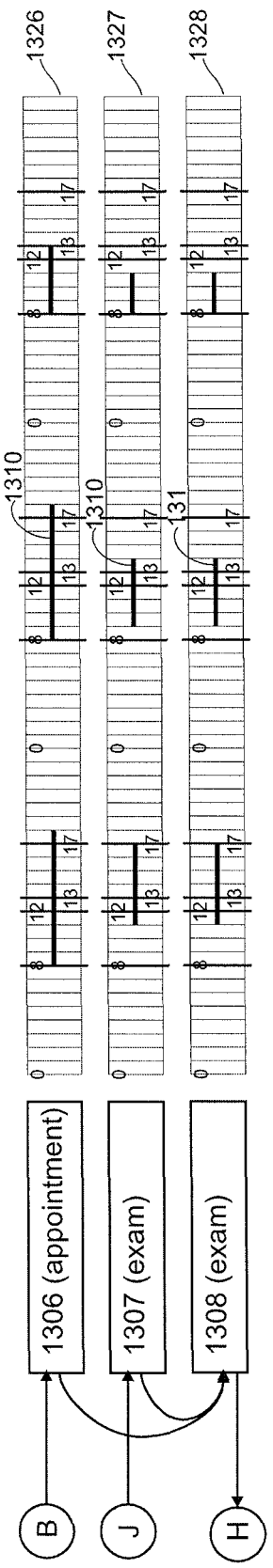

A second step consists of working out the comprising links in the graph in FIG. 3. According to the current invention, this is achieved by processing the time segments in the time windows of the undress, exam and dress actions so that they fall within the time segments of the time window of the appointment action. This is demonstrated in FIGS. 14A, 14B and 14C using the general principles of the current invention that were earlier explained by means of FIG. 8.

Figure 4:
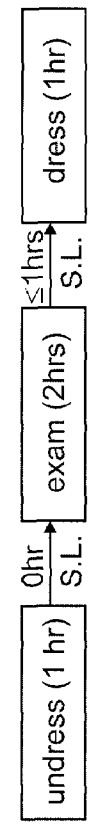
FIG. 4 describes a reduced set of actions that is left after working out the relational and comprising links according to a preferred embodiment.

After this operation, the graph in FIG. 2 or FIG. 3 can be reduced to the one in FIG. 4, with the notion that the time windows associated with the undress, exam and dress actions are not the original ones, but the ones that were obtained from the previous step.

The third step consists of working out the constraints imposed by the sequential links.

The exam action is preceded and followed by another action. According to one aspect of the current invention, this has implications on start and end times of the time segments of the corresponding time windows.

Figure 9:
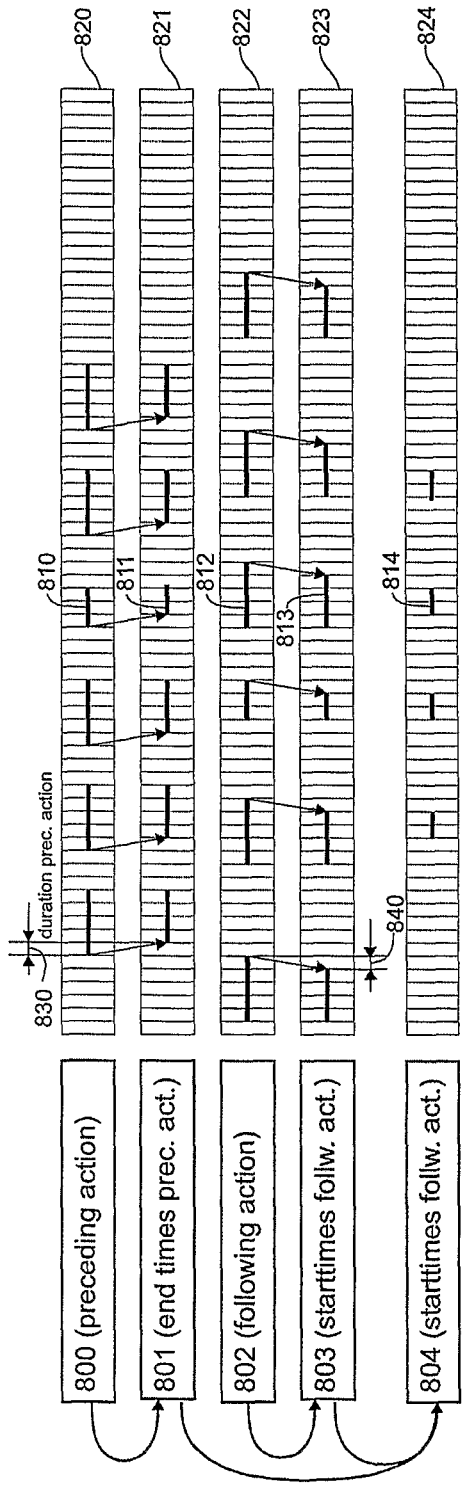
FIG. 9 demonstrates the processing of a sequential link with a preceding action according to a preferred embodiment.
Figure 15:
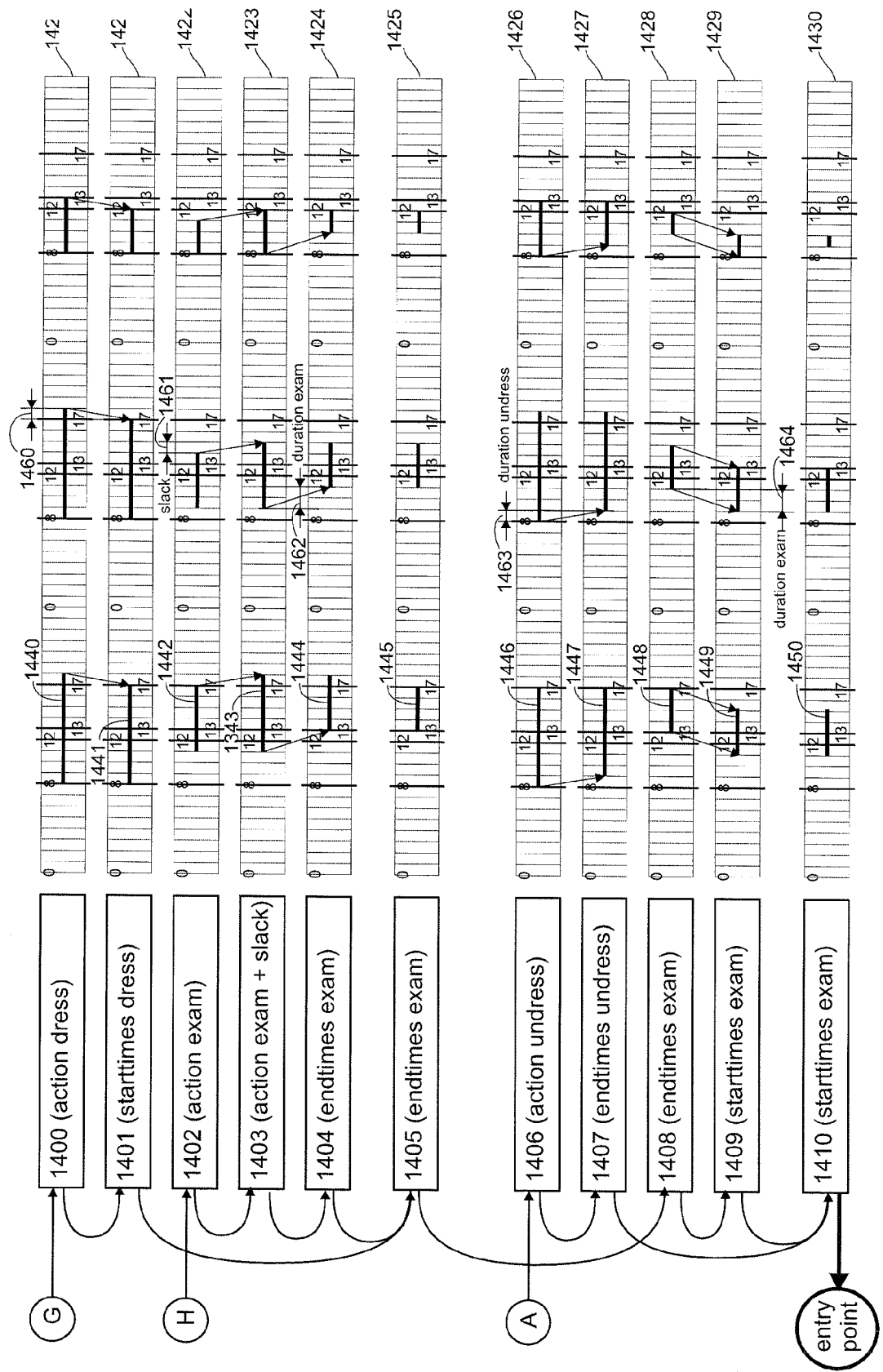
FIG. 15 shows an example of the processing of time windows according to a preferred embodiment.

Referring to FIG. 15, the start times (1310) of the exam should never be earlier than the earliest end times (1307) of the undress action, and the end times (1303) of the exam including slack time should never be later than the latest start times (1301) of the dressing action, according to the general principles that were earlier explained by means of FIGS. 9, 10 and 11.

Figure 5:
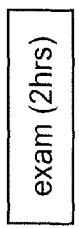
FIG. 5 describes a reduced set of actions that is left over after working out the relational, comprising and sequential links according to a preferred embodiment.

After this operation, the graph in FIGS. 2, 3 and 4 can be reduced to the one in FIG. 5, with the notion that the time window associated with the exam actions are the ones that were obtained from the previous step.

Introducing Deductive and Inductive Logic

According to a preferred embodiment of the current invention, an inductive logic method is used to control the processing of the time windows as opposed to deductive logic. These terms are explained in more detail.

Generally speaking, deductive logic starts with variables of which the values are known (called "the hypotheses") and deduces step by step according to a predefined flow the value of the variable for which a solution is sought (called the "final conclusion"). This processing occurs through the calculation of the value of intermediate values (called "intermediate conclusions").

In deductive logic, the information processing flow itself is the subject of the programming and as a result, once it has been programmed, it is fixed. Therefore, deductive logic programming is efficient for those problems of which the taxonomy of relations between variables is fixed, and only the values of the hypotheses are subject to change.

Figure 16:
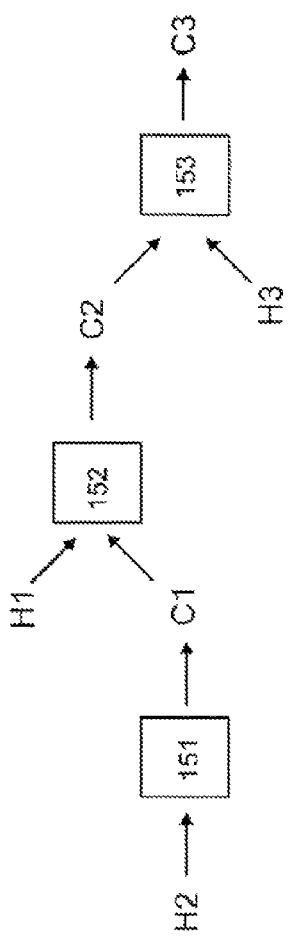
FIG. 16 shows an example of using deductive logic.

An example of a deductive logic method is shown in FIG. 16. H1, H2 and H3 are the basic hypotheses. Processing (151)

the hypothesis H2 results in the intermediate conclusion C1. Processing (152) the conclusion C1 and the hypothesis H1 results in the intermediate conclusion C2. Processing (153) the conclusion C2 and the hypothesis H3 then leads to the final conclusion C3.

In contrary, the entry point for an inductive logic method according to the current invention is the final conclusion itself of which the value is initially unknown. By means of a set of inductive steps that take the form of an exploration process, the data of the hypotheses is first gathered and then systematically processed to calculate the final conclusion.

An inductive step to calculate an (intermediate) conclusion comprises determining what other variables are needed to calculate said (intermediate) conclusion. There are two possibilities:

1) Either the values of the variables that are needed are known because they are either hypotheses or intermediate conclusions of which the value has been earlier determined; in that case the variables can be processed to obtain the (intermediate) conclusion.
2) Or at least one of the variables that are needed is an intermediate conclusion of which the value has not been determined yet; in that case this (intermediate) conclusion initiates a new inductive step.

The subject of the programming in an inductive logic method is not a deductive information processing flow, but a rule set that manages the inductive steps.

Developing a rule set for an inductive method involves determining:

1) the nature (classes) of the variables (intermediate conclusions) that are needed to calculate a conclusion;
2) for each nature (class) of a variable (intermediate conclusion) determining what kind of processing on what other variables (other intermediate conclusions or hypotheses) is needed to calculate the result of said (intermediate) conclusion.

Unlike in a deductive logic method, the problem definition now not only states the values of the hypothesis, but also the taxonomy of the relations between the variables. This allows for far greater flexibility when solving problems that have different taxonomies of relations between variables. Once the rule set has been programmed, problems with a wide variety of taxonomies of relations between the above variables can be solved using the same program.

Figure 17:
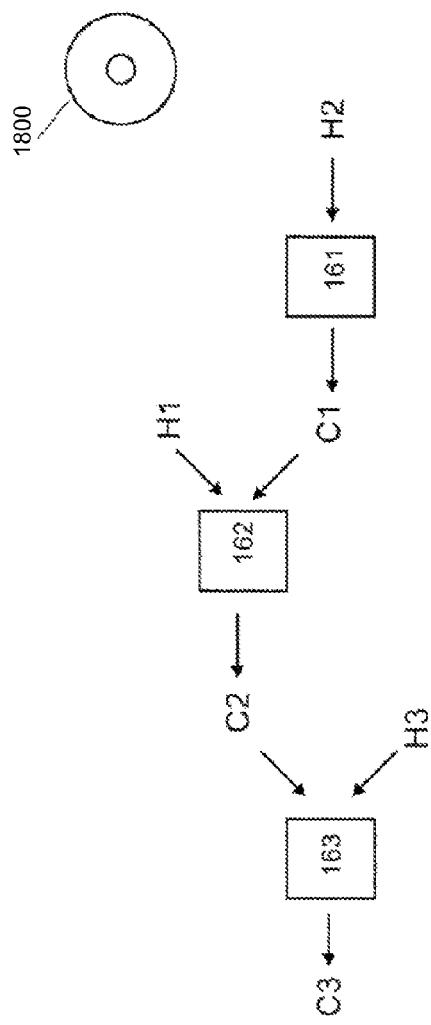
FIG. 17 shows an example of using inductive logic.

An example of using an inductive logic method is presented in FIG. 17. The entry point is a call to calculate the value of the variable C3. The rule set dictates that the variable C3 requires the processing of two other variables being H3, of which the value is known since it is a hypothesis, and the intermediate conclusion C2, of which the value at this point is unknown. The latter causes a new inductive step to calculate the unknown variable C2. The rule set dictates that the variable C2 requires the processing of two other variables H1, of which the value is known since it is a hypothesis, and of the intermediate conclusion C1, of which the value at this point is unknown. The latter causes a new inductive step to calculate C1. The rule set dictates that the variable C1 requires the processing of the variable H2, of which the value is known. This results in the processing of H2 to obtain C1. Now that C1 is known, this results in the processing of C1 and H1 to calculate C2. Now that C2 is known, this results in the processing of C2 and H3 to calculate the final conclusion C3.

Preferred Embodiment Based on Inductive Logic

According to the current invention, the solution of the scheduling problem stated in the above example is preferably carried out by using an inductive logic method.

According to one embodiment, the following classes or variables are used for managing resources:
time window related to an action
time window related to the start times of an action
time window related to the end times of an action According to the same embodiment the inductive logic is managed by a set of three rules:
a first rule dictates that obtaining the value of a variable of the type "start times of an action" requires the processing of the value of the "end times of that action" and the value of "the previous action".
a second rule dictates that obtaining the value of a variable of the type "action" requires the processing of the values of the "parent actions" and the "related actions".
a third rule dictates that obtaining the value of a variable of the type "end times of an action" requires the processing of that same "action", the "slack time" and "the following action".

In a more general case other sets of rules can be selected that however yield equivalent results and also fall within the scope of the current invention. This follows from the fact that the classes of variables in the above rule set are related to each other by simple relationships.

We have found that the above set of three classes of variables in combination with the above three rules provides a self contained method than enables resource scheduling and management of a wide variety of situations.

The method according to the current invention processes time windows and results in a time window that generally comprises a plurality of time segments, each one indicating a single solution of when the corresponding action can take place (or start). The method hence produces not just one solution for the scheduling problem, as in the prior art, but a complete set of solutions.

The method according to the current invention can be used for any resource scheduling and management problem that can be modelled as a set of actions corresponding to resources that are related by a combination of comprising, relating and sequential links and slack time.

Having described the general principles of the current invention we proceed by working out the example that was earlier introduced.

Referring to FIG. 15, the method starts by instantiating a variable start times exam, which is the final conclusion of the scheduling problem.

The symbols in the circles on one of the FIGS. 12 to 15 indicate references to the same symbols in circles in one of the other figures.

Since the value of the variable start times exam at this point is unknown, this induces an inductive step (IS1). The first rule according to the current invention dictates that in order to calculate the value (1410) of the start times of the exam, the values (1408=1405) of the end time of the exam action and (1406=1302) of the undress action are needed. Since none of these values are known at this time, this causes two new inductive steps: a first one (IS2) to enable the calculation of the value (1406=1302) of the undress action and a second one (IS3) for the calculation of the value (1408=1405) of the end times of the exam.

We proceed by first explaining the inductive step (IS2). Referring to FIG. 12 to 15, the second rule dictates that in order to calculate the value (1406=1302) of the undress action requires the processing of the value (1300=1103) of the appointment action which is the parent action. Since the value (1300=1103) of the appointment action is not known at this time, this induces again an inductive step (IS4) for the calculation of that variable. Since this variable (1300=1103)

appointment is of the type "action", the same (second) rule applies, requiring the processing of the values of related dressing room (1101) and patient (1100) actions. The values of these actions are known since they are hypotheses, so this enables to calculate the value of the appointment (1300=1103) action and subsequently of the undress (1406=1302) action.

We next proceed by describing the inductive step (IS3). Referring to FIG. 12 to 15, the third rule dictates that the calculation of the value (1408=1405) of the end times of the exam requires the processing of the value (1402=1308) of the exam action and of the value (1400=1305) of the dress action. Since the variable (1402=1308) of the exam action is of the type "action", the second rule applies, and this requires the processing of the values of the parent appointment (1306=1103) action, and of the related scanner (1200) and operator (1201) actions. The value (1306=1103) of the parent appointment action is calculated the same way as in the inductive step (IS2). The values (1200, 1201) of the relating actions are known, since they are hypotheses, so this enables to calculate the value of the exam (1402=1308) action. Since the variable (1400=1305) is also of the type action, the second rule is applied once more, leading to the processing of the values of the variables (1303=1103) and (1304=1101). At this point the calculation of the value (1408=1405) of the end times of the exam can be completed and subsequently the calculation of the value (1410) of the start times of the exam.

Figure 18:
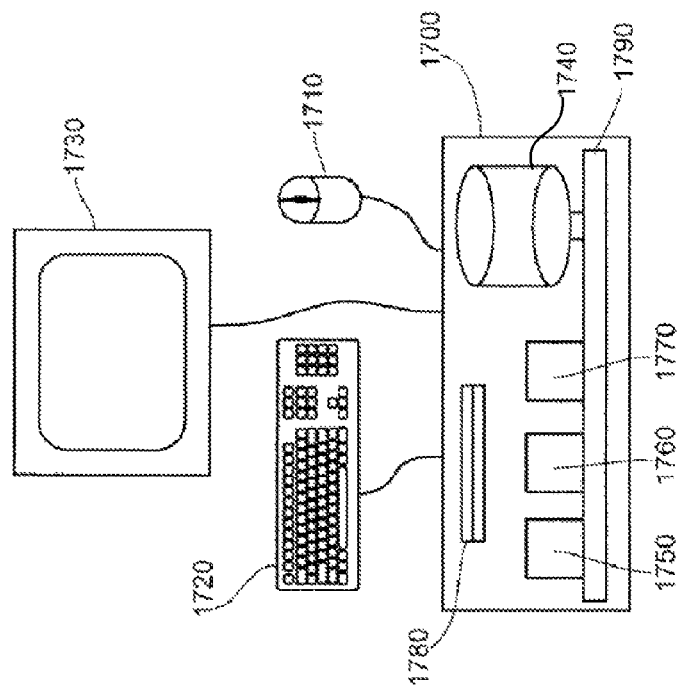
FIG. 18 shows a data processing system according to a preferred embodiment of the current invention.

The above mentioned invention is preferably implemented using a data processing system such as a computer. An embodiment of such a system (1700) is shown in FIG. 18. A computer comprises a network connection means (1750), a central processing unit (1760) and memory means (1770) which are all connected through a computer bus (1790). The computer typically also has a computer human interface for inputting data (1710, 1720) and a computer human interface for outputting data (1730). According to one embodiment, the computer program code is stored on a computer readable medium such as a mass storage device (1740) or a portable data carrier (1800) which is read by means of a portable data carrier reading means (1780).

Having described in detail preferred embodiments of the current invention, it will now be apparent to those skilled in the art that numerous modifications can be made therein without departing from the scope of the invention as defined in the appending claims.

The invention claimed is:

1. A computer-implemented medical appointment scheduling method comprising:
   a computer computing and storing a solution space for a medical appointment comprising all possible medical appointment solutions for a medical appointment scheduling procedure,
   the computer computing and storing a filtered solution space comprising all medical appointment solutions resulting from a filtering of said solution space on availability of resources for performing the medical appointment and a patient's time preferences, the filtered solution space comprising multiple medical appointment solutions,
   the computer flagging the multiple medical appointment solutions of said filtered solution space as occupied,
   the computer selecting and storing one of the flagged medical appointment solutions as an instantiated solution for the medical appointment out of the filtered solution space, wherein the instantiated solution requires verification prior to confirming an instantiated solution for the medical appointment,
   the computer retrieving from memory and displaying on a single screen overviews including: an overview of said patient's medical appointments, an overview of an agenda of the resources for performing the medical appointment, and an overview of details of the instantiated solution, the overviews enabling verification of whether a contextual problem exists for the instantiated solution between items on said overviews by comparatively reviewing the overviews, wherein a contextual problem exists for the instantiated solution when a clinical or practical problem would originate from confirming the medical appointment,
   when no contextual problem exists, confirming said instantiated solution as a confirmed medical appointment,
   when a contextual problem exists, the computer selecting and storing another flagged medical appointment solution as an instantiated solution for the medical appointment out of the filtered solution space, and repeating the verification of whether a contextual problem exists for the instantiated solution based on the overviews until an instantiated solution is confirmed, and
   upon confirmation of said instantiated solution, the computer rendering all non-confirmed flagged medical appointment solutions from said filtered solution space available for another medical appointment scheduling procedure.

2. The method according to claim 1 further comprising the computer recording the confirmed medical appointment in stored agendas of the patient's medical appointments and occupation of the resources for performing the medical appointment.

3. The method according to claim 1 wherein said filtered solution space for the medical appointment is computed by:
   the computer defining relationships between actions of the resources for performing the medical appointment having associated action constraints, said actions being described by time windows comprising linked lists of time segments describing ranges of start times or end times or duration times, said relationships belonging to a set comprising relational, comprising or sequential relationships;
   the computer identifying a set of the resources for performing the medical appointment,
   the computer processing said time windows to determine the possible medical appointment solutions for the actions of the set of the resources for performing the medical appointment wherein said processing comprises an inductive logic step.

4. The method according to claim 3, wherein the inductive logic step comprises:
   the computer obtaining the time windows of the start times of the action by processing time windows of end times of said actions and time windows of a previous action.

5. The method according to claim 4, wherein the inductive logic step of obtaining the time windows of the start times of the actions by processing the time windows of the end times of said actions and the time windows of previous actions comprises:
   the computer adding durations of said previous actions to start times of time segments of the time windows of said previous actions to obtain time windows of end times of said previous actions;
   the computer shifting time segments of the time windows of the end times of said actions backward by durations of said actions to obtain time windows of start times of said actions;

the computer obtaining time windows of the start times of said actions of which segments are cross sections of the segments of the time windows of the end times of the previous actions and segments of the time windows of the start times of said actions.

6. The method according to claim 3, wherein the inductive logic step comprises the computer obtaining the time windows of the end times of the actions by processing time windows of said action, time windows of a following action and slack time.

7. The method according to claim 6, wherein the inductive step of obtaining the time windows of the end times of the actions by processing the time windows of said action, the time windows of a following action and the slack time comprises:
the computer subtracting durations from end times of time segments of the time windows of said following actions to obtain time windows of start times of said following actions;
the computer adding the slack time to the end times of time segments of the time windows of said actions to obtain the time windows of said actions plus the slack time;
the computer adding durations to start times of time segments of the time windows of said action plus the slack time to obtain the time windows of end times of said actions;
the computer obtaining the time windows of the end times of said actions of which time segments are cross sections of time segments of the time windows of the start times of said following actions and time segments of the time windows of the end times of said actions.

8. The method according to claim 3, wherein the inductive logic step comprises the computer obtaining the time windows of the actions by processing time windows of actions that are either parent actions or related actions.

9. The method of claim 8, wherein the inductive step of obtaining the time windows of the actions by processing the time windows of actions that are either parent actions or related actions comprises:
the computer replacing time segments of the time windows of the related actions with time segments that are cross sections of the time segments of said time windows of said related actions;
the computer adjusting start times and end times of time segments of children actions so that the time segments of children actions are comprised in time segments of the time window of the parent actions.

10. The method according to claim 1, wherein at least one of said resources for performing the medical appointment is a patient, a physician, a nurse, a medical diagnostic apparatus, a medical treatment apparatus, an examination room or a treatment room.

11. The method according to claim 1, wherein the instantiated solution is a first instantiated solution and upon rejection of said first instantiated solution, the method further comprises the computer selecting and storing a second instantiated solution, different from the first instantiated solution, out of the filtered solution space.

12. The method according to claim 11 further comprising the computer rendering the first instantiated solution available for another medical appointment scheduling procedure.

13. The method according to claim 1, wherein the flagged medical appointment solutions of said filtered solution space are rendered unavailable for any other medical appointment scheduling procedure by the computer.

14. A computer system comprising:
a computer processing unit, memory, and interface, said computer system configured to execute an appointment scheduling method comprising the steps of:
computing and storing a solution space for a medical appointment comprising all possible medical appointment solutions for a medical appointment scheduling procedure,
computing and storing a filtered solution space comprising all medical appointment solutions resulting from a filtering of said solution space on availability of resources for performing the medical appointment and a patient's time preferences, the filtered solution space comprising multiple medical appointment solutions,
flagging the multiple medical appointment solutions of said filtered solution space as occupied,
selecting and storing one of the flagged medical appointment solutions as an instantiated solution for the medical appointment out of the filtered solution space, wherein the instantiated solution requires verification prior to confirming an instantiated solution for the medical appointment,
retrieving from memory and displaying on a single screen overviews including: an overview of said patient's medical appointments, an overview of an agenda of the resources for performing the medical appointment, and an overview of details of the instantiated solution, the overviews enabling verification of whether a contextual problem exists for the instantiated solution between items on said overviews by comparatively reviewing the overviews, wherein a contextual problem exists for the instantiated solution when a clinical or practical problem would originate from confirming the medical appointment,
when no contextual problem exists, confirming said instantiated solution as a confirmed medical appointment,
when a contextual problem exists, selecting and storing another flagged medical appointment solution as an instantiated solution for the medical appointment out of the filtered solution space, and repeating the verification of whether a contextual problem exists for the instantiated solution based on the overviews until an instantiated solution is confirmed, and
upon confirmation of said instantiated solution, rendering all non-confirmed flagged medical appointment solutions from said filtered solution space available for another medical appointment scheduling procedure.

* * * * *